July 13, 1965

J. MACKERLE 3,194,180

METHOD OF DRIVING A WHEELED VEHICLE, AND VEHICULAR DRIVING WHEEL

Filed Nov. 15, 1962

INVENTOR.
Julius Mackerle
BY
Richard Low
Agt

July 13, 1965 J. MACKERLE 3,194,180
METHOD OF DRIVING A WHEELED VEHICLE, AND
VEHICULAR DRIVING WHEEL
Filed Nov. 15, 1962 4 Sheets-Sheet 2

INVENTOR.
Julius Mackerle
BY

INVENTOR.
Julius Mackerle
BY
Richard Church
Agt

INVENTOR.
Julius Mackerle 3,194,180
METHOD OF DRIVING A WHEELED VEHICLE, AND VEHICULAR DRIVING WHEEL
Julius Mackerle, Prague, Czechoslovakia, assignor to Ustav pro vyzkum motorovych vozidel, Prague, Czechoslovakia
Filed Nov. 15, 1962, Ser. No. 237,924
Claims priority, application Czechoslovakia, June 6, 1961, 3,503/61; Nov. 21, 1961, 6,877/61
8 Claims. (Cl. 105—63)

This application is a continuation-in-part of my copending application Serial No. 200,127, filed on June 5, 1962, now abandoned, for a Method and Device For Driving The Wheels of Vehicles.

This invention relates to a method of driving self-propelled wheeled vehicles, and to wheels for vehicles adapted to be driven by the method of the invention.

An object of the invention is a driving method for wheeled vehicles in which the mechanical movement for driving the vehicle is generated in the driving wheels themselves.

A related object is the elimination of a mechanical power train between a drive motor and a driven wheel.

Another object is the provision of a drive arrangement for a wheeled self-propelled vehicle which achieves the known advantages of electrically driven vehicles having motors mounted directly on the wheels, yet avoids the need for a heavy battery and for the repeated conversion of mechanical energy into electrical energy and vice versa.

With these and other objects in view, the invention in one of its aspects provides one or several wheels of a vehicle with a plurality of pneumatic chambers which are circumferentially distributed about the normally horizontal wheel axis. One wall of each chamber is mounted on the wheel, another chamber wall is spaced radially outward from the mounted wall, and is radially movable relative to the mounted wall responsive to gas pressure in the pneumatic chamber. A control valve connects the several pneumatic chambers with a source of gas under pressure in such a manner as to admit gas under pressure to each chamber at a predetermined angular position of the chamber during rotation of the wheel so as to expand the chamber, and to vent the gas from the chamber in another angular position of the latter. The resulting displacement of the geometrical axis of the wheel including its pneumatic chambers, and of the axis of rotation of the wheel causes the wheel to turn.

Other features and many of the attendant advantages of this invention will be readily appreciated as the same becomes better understood by reference to the following detailed description when considered in connection with the accompanying drawings in which:

FIG. 1 is a diagrammatic view of a first embodiment of the drive arrangement of the invention in elevation, partly in section at right angles to the axis of rotation of a drive wheel;

FIG. 2 diagrammatically illustrates the pressure distribution on the interface between the wheel of the arrangement of FIG. 1, and the ground;

Figure 1:
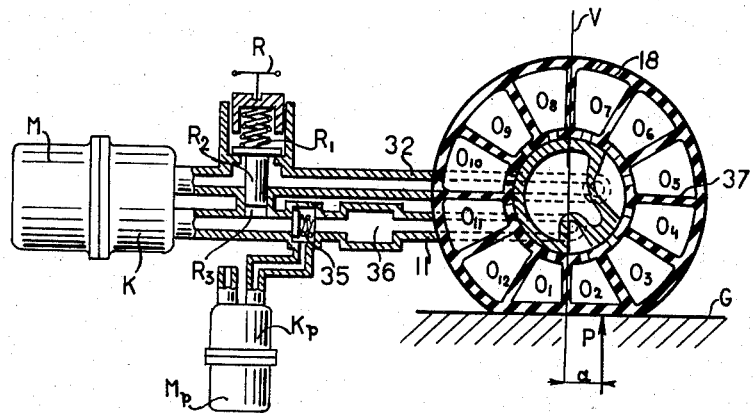

Referring initially to FIG. 1, there is shown a compressor K driven by a motor M. The compressor has an intake tube 32 and a discharge or pressure tube 11. An auxiliary compressor $K_p$ driven by motor $M_p$ has an intake open to the atmosphere and discharges compressed air into the pressure tube 11. The pressure in the pneumatic circuit of the compressor K is held at a desired maximum value by means of a spring loaded relief valve R in the intake tube 32 which is opened against the restraint of its spring $R_1$ by a plunger $R_2$ slidable in a cylinder $R_3$ which communicates with the pressure tube 11. A check valve 35 in the pressure tube 11 prevents air from flowing back into the compressor when the same is stopped.

The pressure tube 11 and the intake tube 32 respectively feed compressed air to a hollow tire 18 and withdraw air from the tire. The tire cavity is divided into twelve pneumatic chambers $O_1$ to $O_{12}$ which are separated from each other by partition walls 37. Each chamber has an inlet which is directed radially inward. The inlets of the chambers $O_2$ and $O_5$ respectively communicate with the pressure tube 11 and the intake tube 32 in the position illustrated in the drawing. The inlets of all other chambers are blocked by stationary valve means which will be described in more detail in connection with FIG. 5. An expansion chamber 36 is interposed in the pressure line 11 between the inlet of the chamber $O_2$ and the check valve 35.

The tire 18 is mounted on a wheel, not shown in FIG. 1, which supports a non-illustrated vehicle. The axis of rotation of the wheel coincides with the axis of the cylinder defined by the inwardly facing walls of the several pneumatic chambers. The outwardly facing walls of the chambers jointly constitute the tire tread, or support the tire tread which rests on the ground G. The tire 18 has substantially the shape of a tore when its several pneumatic chambers are filled with air to uniform pressure, and when no external forces act on the tire.

The afore-described apparatus operates as follows:

When air is forced by the compressor K into the chamber $O_2$, the latter expands vertically toward the supporting surface of the ground G. Since at least a major portion of the chamber $O_2$ is located on one side of a plane V passing vertically through the wheel axis, the expanding chamber $O_2$ exerts an upward force P on the remainder of the tire and wheel structure at a horizontal distance $a$ from the vertical axial plane V. A torque $aP$ is exerted upon the wheel which is turned in a counterclockwise direction as viewed in FIG. 1. The chamber $O_2$ is thereby disconnected from the pressure tube 11, and the chamber $O_1$ assumes the position previously occupied by the chamber $O_2$.

During inflation of the chamber $O_2$, the chamber $O_5$ communicates through its inlet with the intake tube 32 of the compressor K so that the previously expanded chamber $O_5$ is reduced to its normal size and shape by withdrawal of air therefrom into the compressor. Movement of the tire 18 in a counterclockwise direction thus sequentially passes the chambers $O_2$, $O_1$, $O_{12}$, etc. first through a position of communication with the pressure tube 11, and subsequently through a position of communication with the intake tube 32. The position of chamber expansion by compressed air is spaced angularly from the position of chamber exhaustion by an angle of about 90° relative to the axis of rotation of the wheel. Three of the twelve chambers are simultaneously in the expanded condition.

It is evident that the direction of the torque applied to the wheel can be reversed by shifting the point of communication between the pressure tube 11 and the several pneumatic chambers in the tire 18 to a point on the other side of the vertical plane V passing through the axis of rotation of the wheel, and by correspondingly shifting the point of communication between the intake tube 32 and the chambers. The magnitude of the torque can be increased under otherwise similar conditions by increasing the output of the compressor K.

In a conventional tire having a substantially undivided cavity, the internal air pressure is determined mainly by the load applied to the wheel and by the area of contact between the wheel and the ground surface on which it is supported. It is a reasonable assumption that the side walls of the tire are sufficiently flexible so as not to influence pressure distribution to a significant extent, and the pressure on any portion of the tire surface is thus equal to the quotient of wheel load and contact area as long as the wheel stands still. The contact area is symmetrically distributed with respect to a vertical plane passing through the axis of rotation of the wheel.

Figure 2:
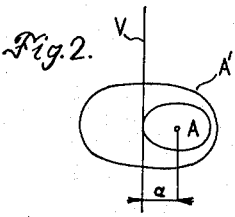

In the wheel of the invention illustrated in FIG. 1, the contact pressure is not uniform, and it is not symmetrically distributed with respect to a vertical axial plane. The tire of the invention thus acts as the drive motor which causes the wheel to turn. FIG. 2 diagrammatically illustrates the boundary A' of the contact area between the tire 18 and the ground G. The center of the upward pressure exerted by the expanding pneumatic chambers O is at A. The drive motor of the invention is effective under all conditions which avoid slip between the tire tread and the ground G. The limiting condition is reached when the spacing $a$ of the point A from the vertical plane V equals the product of effective tire radius and friction coefficient. The effective tire radius is the distance of the axis of rotation from the ground. The friction coefficient for rubber and dry ground is usually between about 0.4 and 1.0.

For operation on level ground, the spacing $a$ between the vertical axial plane and the force P resulting from expansion of the chamber O is quite small.

Figure 3:
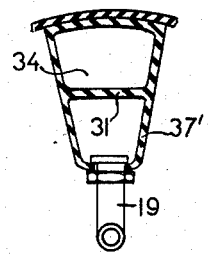
FIG. 3 shows a pneumatic chamber for the drive arrangement of FIG. 1 drawn to a larger scale and in radial section.
Figure 4:
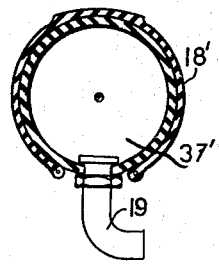
FIG. 4 shows the pneumatic chamber of FIG. 3 in section on an axial plane.

The basic feature which distinguishes the tire of the invention from conventional low pressure tires of the automotive type is the division of the tire cavity into a plurality of circumferentially distributed chambers. This subdivision may be achieved in several ways. As shown in FIGS. 3 and 4, an outer tire 18' substantially identical with a conventional low pressure tire of the tube type, contains individual tube sections 34, each having two flat partition walls 37' inclined relative to each other and of circular shape. The flat walls 37' are connected by a wall of circular cross section, so that each tube section has the shape of a section of a tore. The wall of each tube section 34 which faces radially inward toward the axis of rotation is equipped with a connecting tube 19 which serves as an inlet for compressed air, and for withdrawal of the air. The centers of the two flat walls 37' are tied together by means of cords 31 extending approximately along the circular axis of the tire shape. The tube section 34 is thus free to expand radially, but prevented from expanding in a circumferential direction.

The tire 18 differs from tire 18' by integral radial partition walls 37 which form the airtight pneumatic chambers. Inflatable tube elements may be inserted in the spaces between the partition walls 37 if the latter are not airtight themselves.

The compressor K merely circulates air between the several pneumatic chambers of the tire. It is driven by the motor M which may be a piston engine of conventional automotive type or a rotary engine. The rotary speed of the compressor K controls the torque applied to the wheel by the tire. The auxiliary compressor $K_p$ furnishes air under pressure for the initial inflation of the several pneumatic chambers, and as make up for air lost through unavoidable leakage. The pressure level within the air system is adjustably maintained by the relief valve R. The auxiliary compressor may also supply air for driving the vehicle in an emergency. If emergency use of the compressor $K_p$ for driving purposes is contemplated, a valved conduit is preferably interposed between the intake conduit 32 and the normally open intake of the auxiliary compressor.

The check valve 35 and the expansion chamber 36 in the pressure tube 11 act as shock absorbers when the tire 18 travels over rough terrain.

Figure 5:
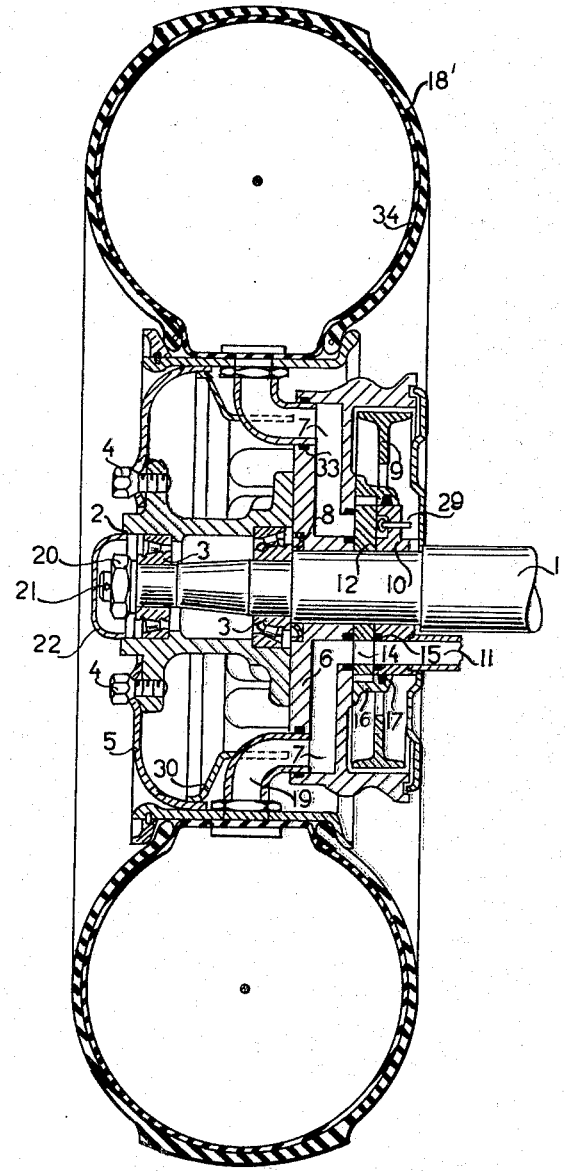
FIG. 5 is an axially sectional view of a wheel for the drive arrangement illustrated diagrammatically in FIG. 1.

FIG. 5 illustrates a driving wheel of the invention equipped with the tire 18' shown in FIGS. 3 and 4, and connected to a compressed air system of the type illustrated in FIG. 1, but not seen in FIG. 5. The compressors with their associated motors will be understood to be mounted on the vehicle body of which only an axle 1 is shown in FIG. 5.

A wheel hub 2 is journaled on the axle 1 by means of roller bearings 3. A wheel 5 is attached to the hub 2 by screws 4. A rotating valve disc 6 is fixedly fastened to the hub 2 and the wheel 5. Twelve passages 7 in the disc 6 of which two are visible in FIG. 5 are connected to respective tube sections 34 in a tire 18' by connecting tubes 19. The tire 18' is mounted on the rim of the wheel 5. An integral portion of the valve disc 6 has a cylindrical inner face constituting a brake drum which cooperates with brake shoes 9 mounted on the axle 1. A seal 8 on the valve disc 6 adjacent the roller bearings 3 prevents lubricant from reaching the brake.

Figure 6:
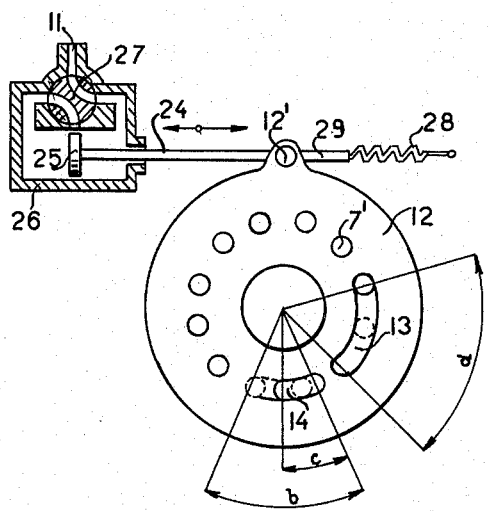
FIG. 6 shows elements of the valve mechanism of the arrangement of FIG. 1 in a diagrammatic view.

A flange 10 is fixedly mounted on the axle 1. The pressure tube 11 connected to the compressor K, not seen in FIG. 5, passes through the flange 10 and has an orifice flush with the flange face opposite the rotary valve disc 6. A stationary valve disc 12 is adjustably fastened on the axle 1 between the opposite faces of the rotating disc 6 and of the flange 10, and is in simultaneous sealing engagement with these faces. Slots 13, 14 in the stationary valve disc 12, better seen in FIG. 6, are simultaneously alignable with the opposite orifices of the passages 7 and of the tubes 11 and 32. A pull rod 29 attached to the valve disc 12 actuates pivoting movement of the latter about the axis of the axle 1. Annular gaskets 15 interposed between the discs 6, 12 and the flange 10 prevent leakage of air from the continuous conduit constituted by the pressure tube 11, the slot 14 in the disc 12, and the passages 7. The sealing faces of the discs 6, 12, and of the flange 10 are protected against foreign matter by a cover 16 attached to the rotating disc 6 and movably sealed to the flange 10 by a gasket 17.

The bearings 3 are retained on the axle 1 by means of a nut 20 secured by a cotter pin 21 on a threaded end portion of the axle. A wheel hub cover 22 protects the nut 20. The wheel 5 may be removed from the hub 2 together with the tire 18' after loosening of the screws 4 by pulling the wheel axially from the hub. The ends of the connecting tubes 19 are inserted in an axial direction in corresponding orifices of the passages 7, and are slidably sealed therein by gasket rings 33. An annular guide disc 30 mounted on the wheel 5 facilitates installation of the wheel in such a manner that all connecting tubes 19 are simultaneously inserted into respective orifices of the passages 7. A central aperture of the disc 30 engages a corresponding portion of the hub 2 and thereby guides the wheel into proper alignment.

The stationary valve disc 12 and its controls are shown in FIG. 6 as viewed in the direction of the wheel axis. The disc 12 has a central aperture conforming to the axle 1. Two slot-shaped ports 13, 14 in the valve disc are elongated along a common circle about the common axis of the disc 12 and the axle 1. An integral lug 12' radially projects from the disc 12 and is hingedly attached to a pull rod 29. The rod 29 is pivotally connected to a piston 25 by a piston rod 24. The piston 25 is reciprocable in a pneumatic cylinder 26. A threeway valve 27 is connected to the pressure tube 11, to the atmosphere, and to the spaces in the cylinder 26 on either side of the piston 25, and can be rotated by a non-illustrated actuating handle to connect either one of the cylinder spaces to the tube 11 while venting the other one to the atmosphere, or to seal both cylinder spaces. A spring 28 urges the valve disc 6 into a normal starting position.

The pressure port 14 communicates with the pressure tube 11 in all operative positions of the rotatable valve disc 12, and the intake port 13 is always connected to the intake tube 32. The circumferential length of the slot 14 corresponds to the angular spacing of two adjacent orifices 7' of passages 7, and the length of the slot 13 to that of three consecutive orifices 7'. At least one orifice 7' thus communicates with the slot 14 at all times, and at least two orifices communicate with the slot 13. Air under pressure is thereby admitted to the chambers 34 while they travel through an arc $c$ of 30°, and air is withdrawn during travel through an arc $d$ of 60°. The position of the disc 12 may be varied over an angle of 30° by admitting air to the cylinder 26 so that the position of the slot 14 may be anywhere within an arc $b$ of 60° which is bisected by the plane V.

The driving wheel illustrated in FIGS. 5 and 6 is operated as follows:

While the vehicle stands still, both compressors K and $K_p$ may be stopped. The air pressure within the several chambers 34 is uniform. If air should be lost by leakage, normal basic tire pressure can be restored by operating the compressor $K_p$ before the compressor K is started. Simultaneously, tire pressure may be adjusted to the requirements of the route to be traveled. A relatively low overall tire pressure, for instance, is preferred for travel over soft ground.

When the motor M is started, air passes from the pressure tube 11, through the slot 14 in the stationary disc 12 and a corresponding passage 7 in the rotating disc 6 into a chamber 34 of the tire 18'. When the disc 12 is in the starting position the larger or major portion of the chambers 34 connected to the pressure line 11 is spaced a small distance from the plane V in a direction opposite to the intended direction of travel. As the air pressure in the connected chamber 34 rises, the vector representing the vertical forces acting between the tire tread and the ground is shifted backward of the plane V. When the resulting torque reaches a magnitude sufficient to overcome frictional resistance, the vehicle starts rolling.

As the pressure increases in the space of the cylinder 26 connected to the pressure tube 11, the piston 25 moves against the restraint of the spring 28 to pivot the disc 12 counterclockwise, as viewed in FIG. 6, toward a position in which the slot 14 is almost entirely to the rear of the plane V relative to the direction of vehicle movement. Similarly, the spacing $a$ of the resultant P of the tire pressure applied to the ground G is increased, and the torque $aP$ rises without change in the magnitude of the overall tire pressure P.

As the orifices 7' of the passages 7 in the disc 6 move past the slots 14, 13, the several tube sections or pneumatic chambers 34 in the tire 18' are sequentially inflated and deflated in the manner described above.

To stop the vehicle, the valve 27 is reversed, or the brake shoes 9 are applied after the compressor K has been stopped, whereby the valve disc 12 returns to its starting position. With the valve 27 reversed, stopping of the vehicle is followed by reverse movement of the vehicle as the slot 14 is shifted to the opposite side of the plane V.

Figure 8:
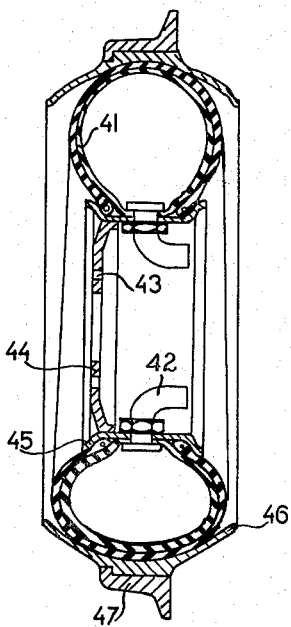
FIG. 8 is a sectional view of the wheel of FIG. 7 taken on an axial plane.
Figure 9:
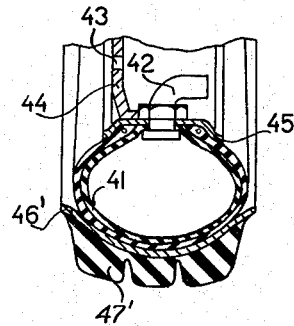
FIG. 9 shows a modified wheel of the invention in a fragmentary axially sectional view.
Figure 7:
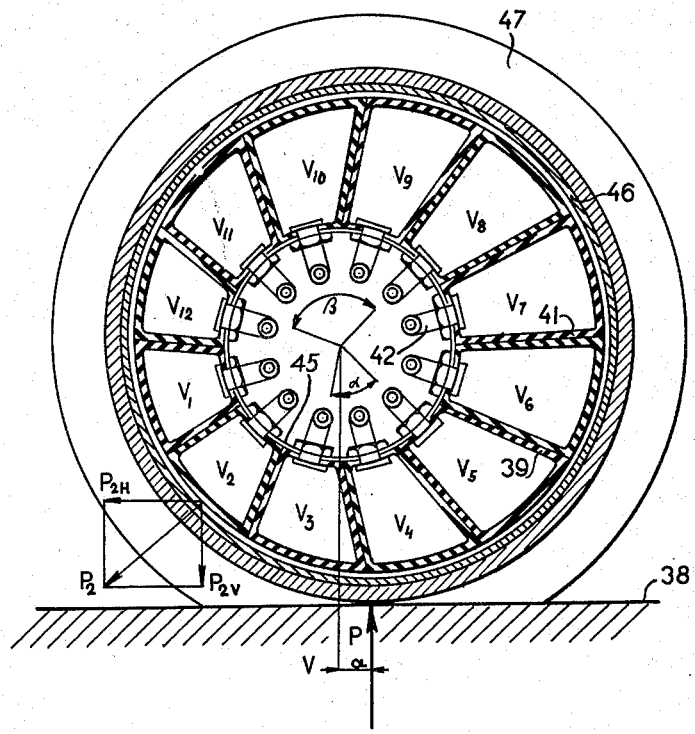
FIG. 7 shows another drive wheel of the invention in section on a radial plane.

The tire 18' illustrated in FIG. 5 is best suited for travel over soft ground, and for travel over hard road surfaces at relatively light loads. The invention is readily adapted to the driving of vehicles for which readily deformable treads are not practical, such as heavy trucks or vehicles intended for travel over rails and deriving guidance from the rails. Modified wheel arrangements of the invention suitable for the latter purposes are illustrated in FIGS. 7, 8, and 9. The wheels, tires, and treads shown in FIGS. 7 to 9 are fastened on a vehicle body including an axle corresponding to the axle 1 and all those elements which are permanently mounted on the axle of the embodiment of FIG. 5.

FIGS. 7 and 8 illustrate a tire-equipped wheel intended for travel on a rail 38. A low pressure pneumatic tire 41 is arranged on the rim 45 of a wheel 44. The tire is divided into twelve circumferentially juxtaposed pneumatic chambers $V_1$ to $V_{12}$ by integral air tight partition walls 39. Connecting tubes 42 mounted on the rim 45 connect each chamber with the valve arrangement for sequentially admitting air under pressure to the pneumatic chambers $V_1$ to $V_{12}$ and for withdrawing the air. A rigid steel ring 46 envelops the tire 41. Its internal face directed toward the wheel axis is concave to retain a firm connection with the tire 41 under all conditions of inflation of the latter. A standard railroad wheel flange 47 is secured to the ring 46, and runs on the rail 38 in the usual manner. The wheel arrangement shown in FIGS. 7 and 8 in radial and axial section respectively is mounted on the vehicle by means of screws passing through apertures 43 in the wheel 44.

The wheel arrangement partly shown in axial section in FIG. 9 is identical with that illustrated in FIGS. 7 and 8 except for a steel ring 46' to which a solid rubber tread 47' is vulcanized, and which replaces the similarly shaped ring 46 with railroad flange 47.

The wheel arrangements shown in FIGS. 7 to 9 cooperate with a valve arrangement closely similar to that shown in FIGS. 5 and 6 except for the size and location of the valve slots which connect the chambers $V_1$ to $V_{12}$ to the pressure tube 11 and to the intake tube 32 of the compressor K. The orifices 7' in the rotatable valve disc which cooperate with these slots are arranged in common axial planes with the corresponding connecting pipes 42. The position of the valve slots in the forward driving position is therefore indicated in FIG. 7 by angles whose apices are at the center of the central aperture in the wheel 44, corresponding to the axis of rotation of the wheel.

The pressure slot connected to the pressure tube 11 extends over an arc $\alpha$ of 60° so that a group of at least two, and not more than three pneumatic chambers is simultaneously connected to the pressure tube 11. The intake slot connected to the intake tube 32 extends over an arc $\beta$ of 150° so that a group of four or five pneumatic chambers communicates with the intake tube 32. The chambers being expanded in the position shown in FIG. 7 are chambers $V_3$, $V_4$, and $V_5$. A major portion of these chambers taken jointly is located on the right side of the vertical plane V passing through the wheel axis, as viewed in FIG. 7. The five chambers $V_8$ to $V_{12}$ are in the process of being deflated, and a major portion of the latter chambers, taken jointly, is located on the left side of the plane V. The chambers $V_8$ to $V_{12}$ are approximately diametrically opposite the chambers $V_3$ to $V_5$. The remaining chambers $V_6$, $V_7$ and $V_1$, $V_2$ are sealed, the first two being in the inflated and expanded condition, the latter two in the deflated condition.

The wheel load P (FIG. 7) is transmitted from the wheel to the rail 38 at the point of tangential contact between the rail 38 and the flange 47. This point is offset by the distance $a$ from a vertical plane V through the axis of the wheel hub which transmits the weight of the vehicle to the wheel. Therefore, a torque $aP$ is exerted on the wheel arrangement to rotate it counterclockwise about its axis. The force P exerted by the flange 47 on the rail 38 and vice versa is equal to the resultant of the forces exerted by the air in the individual chambers $V_1$ to $V_{12}$ on the steel ring 46. As illustrated in the example of chamber $V_2$, the force $P_2$ exerted by the air in the chamber $V_2$ on the ring 46 has a horizontal component $P_{2H}$ and a vertical component $P_{2v}$. The horizontal components of the individual forces exerted by the several chambers are balanced. The vertical components combine to a force of the magnitude P. This is achieved by having higher air pressure in the chambers located near the rail 38 and to the rear of the plane V relative to the direction of wheel movement, and lower air pressure in the chambers located forward of the plane V and remote from the rail 38.

As in the embodiments of the invention described with reference to FIGS. 1 to 6, the distance $a$ is varied by changing the pressure differential between the intake tube 32 and the pressure tube 11, and by changing the position of the arcs $\alpha$ and $\beta$ in a manner apparent from FIG. 6. Shifting of the stationary valve disc 12 varies the magnitude and direction of the eccentricity of the wheel hub relative to the flange, and thereby provides in effect a continuously variable transmission ratio in the pneumatic system connecting the motor M to the vehicle wheels. The transmission ratio may be varied automatically by the piston 25, or by the operator controlling the displacement of the piston by means of the valve 27, and arresting the piston in any desired position.

The wheel arrangements illustrated in FIGS. 7 to 9, permit the arcs $\alpha$ and $\beta$ to be arranged symmetrically with respect to the plane V so that no driving force is applied to the wheels even when the compressor K operates. When the slots in the fixed valve disc are further shifted, reverse movement of the wheels is actuated. An idling position can be achieved only when the intake and pressure slots are symmetrically arranged relative to the wheel axis, and it is evident that such an arrangement is also applicable to the wheel discussed hereinabove with reference to FIGS. 1 to 5.

The driving method of the invention may be applied to a single wheel, to a pair of wheels arranged in a common plane transverse of the direction of vehicle movement, or to all wheels of the vehicle. The wheels may be mounted for rotation about axes which are fixed relative to the vehicle body, or the drive wheels of the invention may be additionally pivoted in steering arrangements about vertical axes. The tubes 11 and 32 are preferably flexible to allow any desired movement between the axle 1 and the remainder of the vehicle body.

It should be understood, of course, that the foregoing disclosure relates to only a preferred embodiment of the invention and that it is intended to cover all changes and modifications of the example of the invention herein chosen for the purpose of the disclosure which do not constitute departure from the spirit and scope of the invention set forth in the appended claims.

What is claimed is:
1. In a drive arrangement for a wheeled vehicle, in combination:
  (a) a vehicle body;
  (b) wheel means rotatable on said body about a horizontally extending axis;
  (c) a plurality of pneumatic chambers circumferentially distributed about said axis, said chambers having respective wall members mounted on said wheel means, and respective other wall members spaced from the corresponding mounted wall members in a radially outward direction and radially movable relative to the some responsive to gas pressure in the respective chambers;
  (d) Compressor means having intake means and discharge means for circulating a gas under pressure;
  (e) control valve means interposed between said compressor means and said plurality of chambers for sequentially admitting said gas under pressure from said discharge means to each chamber at a predetermined angular position of said chamber during rotation of said wheel means, and for venting said gas from said chamber to said intake means at another angular position of said chamber; and
  (f) a substantially rigid ring member of circular cross section having an internal annular face, said other wall members engaging said internal face.

2. In an arrangement as set forth in claim 1, said internal face being concave.

3. In an arrangement as set forth in claim 1, said ring member having an external face, and tread means on said external face.

4. In an arrangement as set forth in claim 3, said tread means including a railroad flange.

5. In a drive arrangement for a wheeled vehicle, in combination:
  (a) a vehicle body;
  (b) wheel means rotatable on said body about a horizontally extending axis;
  (c) a plurality of pneumatic chambers circumferentially distributed about said axis, each chamber having
    (1) one wall member mounted on said wheel means,
    (2) another wall member spaced from said one wall member in a radially outward direction and movable relative to said one wall member responsive to gas pressure in said chamber, and
    (3) two circumferentially spaced walls connecting said one wall member to said other wall member;
  (d) cord means in each chamber connecting said two walls for limiting expansion of said chamber in a circumferential direction;
  (e) compressor means having intake means and discharge means for circulating a gas under pressure; and
  (f) control valve means interposed between said compressor means and said plurality of chambers for sequentially admitting said gas under pressure from said discharge means to each chamber at a predetermined angular position of said chamber during rotation of said wheel means, and for venting said gas from said chamber to said intake means at another angular position of said chamber in such a manner that said wheel means may be rotated on said body when said body is supported on a surface by said wheel means and said chambers.

6. In a drive arrangement for a wheeled vehicle, in combination:
  (a) a vehicle body;
  (b) wheel means rotatable on said body about a horizontally extending axis;
  (c) a plurality of pneumatic chambers circumferentially distributed about said axis, each chamber having
    (1) one wall member mounted on said wheel means,
    (2) another wall member spaced from said one wall member in a radially outward direction and movable relative to said one wall member responsive to gas pressure in said chamber, and
  (d) compressor means having intake means and discharge means for circulating a gas under pressure;
  (e) an intake conduit and a discharge conduit respectively communicating with said intake means and said discharge means;
  (f) control valve means connected to said compressor means by said intake conduit and said discharge conduit, and connected to said chambers for sequentially admitting said gas under pressure from said discharge means to each chamber at a predetermined angular position of said chamber during rotation of said wheel means, and for venting said gas from said chamber to said intake means at another angular position of said chamber;
  (g) check valve means in said discharge conduit for selectively passing gas under pressure from said discharge means toward said control valve means;

(h) relief valve means communicating with said intake conduit for maintaining fluid pressure in said intake conduit at a predetermined maximum pressure; and (i) auxiliary compressor means communicating with a portion of said discharge conduit between said check valve means and said control valve means for supplying a gas under pressure to said discharge conduit.

7. In an arrangement as set forth in claim 1, said horizontally extending axis defining a vertical plane, a first group of said pressure chambers being simultaneously connected to said discharge means of said compressor means by said valve means while one pressure chamber of said group is in said predetermined angular position, and a second group of said pressure chambers being simultaneously vented by said valve means while one pressure chamber of said second group is in said other angular position, respective major portions of said groups being at opposite sides of said plane, said groups having a common plane of symmetry passing through said axis.

8. In a drive arrangement as set forth in claim 1, said intake means, said discharge means, and said control valve means jointly constituting the pressure fluid circuit of said compressor means, auxiliary compressor means for supplying a gas under pressure to said circuit, and relief valve means communicating with said pressure fluid circuit for maintaining fluid pressure therein at a predetermined maximum pressure.

References Cited by the Examiner

UNITED STATES PATENTS

| | | | |
|---|---|---|---|
| 210,492 | 12/78 | Broja | 180—8 |
| 477,769 | 6/92 | Millet | 152—334 X |
| 581,278 | 4/97 | Goddard | 180—8 |
| 584,218 | 6/97 | Goddard | 180—8 |
| 607,265 | 7/98 | McLean | 251—31 |
| 2,049,078 | 7/36 | Otis | 60—62 |
| 2,120,546 | 6/38 | Burt | 180—66 X |
| 2,155,564 | 4/39 | Schippel | 295—12 |

FOREIGN PATENTS

| | | |
|---|---|---|
| 336,447 | 1/04 | France. |

A. HARRY LEVY, *Primary Examiner.*

PHILIP ARNOLD, *Examiner.*